US011127120B2

(12) United States Patent
Oba et al.

(10) Patent No.: US 11,127,120 B2
(45) Date of Patent: Sep. 21, 2021

(54) COIN IDENTIFICATION APPARATUS, COIN PROCESSING APPARATUS, AND COIN IDENTIFICATION METHOD

(71) Applicant: LAUREL PRECISION MACHINES CO., LTD., Osaka (JP)

(72) Inventors: Yosuke Oba, Kawaguchi (JP); Masataka Takahashi, Matsudo (JP)

(73) Assignee: LAUREL PRECISION MACHINES CO., LTD., Osaka (JP)

( * ) Notice: Subject to any disclaimer, the term of this patent is extended or adjusted under 35 U.S.C. 154(b) by 99 days.

(21) Appl. No.: 16/582,238

(22) Filed: Sep. 25, 2019

(65) Prior Publication Data

US 2020/0051220 A1    Feb. 13, 2020

Related U.S. Application Data

(63) Continuation of application No. PCT/JP2018/012183, filed on Mar. 26, 2018.

(30) Foreign Application Priority Data

Mar. 31, 2017    (JP) .............................. JP2017-070654

(51) Int. Cl.
*G06T 7/60* (2017.01)
*G06T 5/00* (2006.01)
*G07D 5/02* (2006.01)

(52) U.S. Cl.
CPC ................ *G06T 5/006* (2013.01); *G06T 7/60* (2013.01); *G07D 5/02* (2013.01); *G07D 2205/00* (2013.01)

(58) Field of Classification Search
CPC .............. G06T 5/006; G06T 7/60; G07D 5/02
See application file for complete search history.

(56) References Cited

U.S. PATENT DOCUMENTS 5,887,697 A    3/1999    Takahashi et al.

FOREIGN PATENT DOCUMENTS

| CN | 1164081 A | 11/1997 |
|----|-----------|---------|
| CN | 1499437 A | 5/2004 |
| CN | 102610020 A | 7/2012 |
| CN | 102737436 A | 10/2012 |

(Continued)

OTHER PUBLICATIONS

Extended European Search Report dated Dec. 11, 2020 in European Application No. 18777056.5, 8 pages.

(Continued)

*Primary Examiner* — Sam Bhattacharya
(74) *Attorney, Agent, or Firm* — Nixon & Vanderhye P.C.

(57) ABSTRACT

A coin identification apparatus includes: a line sensor that detects line image data of a coin being conveyed, the coin being subject to identification; an acquisition unit that acquires the line image data at predetermined sampling intervals; an estimation unit that calculates, for each of the acquired line image data items, a similarity between the acquired line image data and reference line data for each angle, the reference line data being a part of reference pattern image data indicating a coin having a reference pattern, the estimation unit estimating a rotary angle of the coin subject to identification based on the calculated similarity; a correction unit that corrects the line image data based on the estimated rotary angle; and an identification unit that identifies the coin subject to identification based on the corrected line image data.

7 Claims, 14 Drawing Sheets

(56) References Cited

FOREIGN PATENT DOCUMENTS

| | | |
|---|---|---|
| CN | 104123780 A | 10/2014 |
| DE | 697 22 301 T2 | 4/2004 |
| EP | 0 640 944 A1 | 3/1995 |
| EP | 0 683 473 A2 | 11/1995 |
| JP | 09-231432 | 9/1997 |
| JP | 2001-195627 | 7/2001 |
| JP | 2002-170105 | 6/2002 |
| JP | 2003-196699 | 7/2003 |
| JP | 2006-262956 | 10/2006 |
| JP | 2013-210922 A | 10/2013 |
| JP | 2015-102894 | 6/2015 |
| WO | WO 2012/036956 A1 | 3/2012 |

OTHER PUBLICATIONS

International Search Report for PCT/JP2018/012183 dated May 29, 2018, 3 pages.
First Office Action dated Feb. 20, 2021 in Chinese Application No. 201880021215.8, with English translation, 17 pages.

COIN IDENTIFICATION APPARATUS, COIN PROCESSING APPARATUS, AND COIN IDENTIFICATION METHOD

CROSS-REFERENCE TO RELATED APPLICATIONS

The present application is a continuation application of International Application No. PCT/JP2018/012183, filed Mar. 26, 2018, which claims priority to Japanese Patent Application No. 2017-070654, filed Mar. 31, 2017. The contents of these applications are incorporated herein by reference.

BACKGROUND OF THE INVENTION

Field of the Invention

The present invention relates to a coin identification apparatus, a coin processing apparatus, and a coin identification method.

Description of Related Art

A coin identification apparatus is used in a coin processing apparatus. The coin identification apparatus is disposed on the conveyance path, captures with an imaging unit an image of a coin that is being conveyed, and performs identification of the coin's denomination and the like using the captured image that has been acquired. An area sensor such as a CCD camera is known as an imaging unit. For example, Japanese Unexamined Patent Application, First Publication No. 2015-102894 discloses the realization of a reduction in the size and cost of the apparatus by using a line sensor.

SUMMARY OF INVENTION

If the coin being conveyed passes over the line sensor while rotating (a so-called rotary state), the image is deformed, leading to the possibility of a reduction in the identification accuracy.

An object of the present invention is to provide a coin identification apparatus, a coin processing apparatus, and a coin identification method that can improve identification accuracy even when a coin passes over a line sensor while rotating.

In order to achieve the above object, a coin identification apparatus according to an aspect of the present invention includes: a line sensor that detects line image data of a coin being conveyed, the coin being subject to identification; an acquisition unit that acquires the line image data at predetermined sampling intervals; an estimation unit that calculates, for each of the acquired line image data items, a similarity between the acquired line image data and reference line data for each angle, the reference line data being a part of reference pattern image data indicating a coin having a reference pattern, the estimation unit estimating a rotary angle of the coin subject to identification based on the calculated similarity; a correction unit that corrects the line image data based on the estimated rotary angle; and an identification unit that identifies the coin subject to identification based on the corrected line image data.

A coin processing apparatus according to an aspect of the present invention includes the above coin identification apparatus and processes the coin subject to identification based on an identification result by the coin identification apparatus.

A coin identification method according to an aspect of the present invention includes: acquiring, at predetermined sampling intervals, line image data of a coin being conveyed, the coin being subject to identification, the line image data being detected by a line sensor; calculating, for each of the acquired line image data items, a similarity between the acquired line image data and reference line data for each angle, the reference line data being a part of reference pattern image data indicating a coin having a reference pattern; estimating a rotary angle of the coin subject to identification based on the calculated similarity; correcting the line image data based on the estimated rotary angle; and identifying the coin subject to identification based on the corrected line image data.

According to the present invention, it is possible to provide a coin identification apparatus, a coin processing apparatus, and a coin identification method that can improve the identification accuracy even if a coin passes over the line sensor while rotating.

EMBODIMENTS FOR CARRYING OUT THE INVENTION

An embodiment of the present invention will be described below with reference to the drawings.

Figure 1:
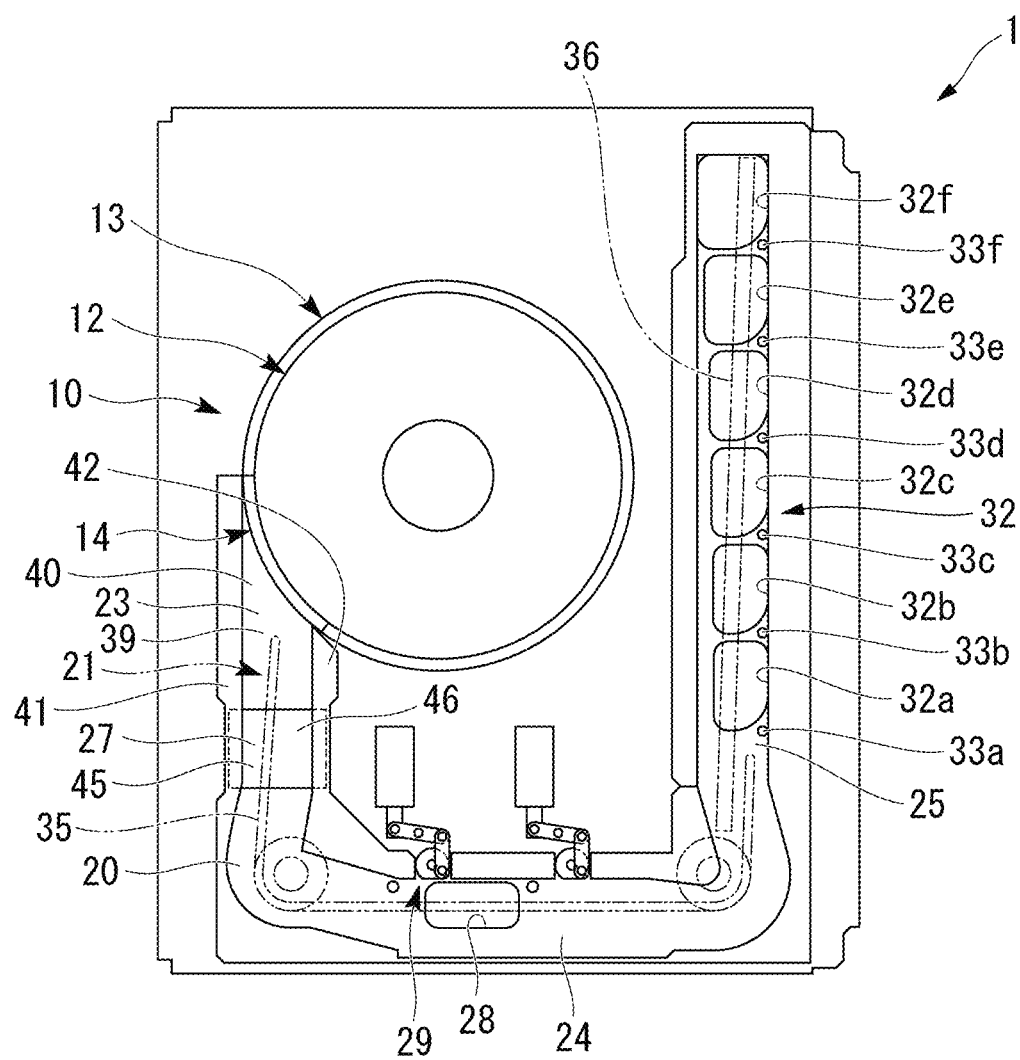
FIG. 1 is a plan view showing the coin processing apparatus according to the embodiment of the present invention.

The coin processing apparatus according to the present embodiment is a coin processing apparatus that counts loose coins inserted from the outside of the apparatus while identifying the coins, and stores the loose coins according to denomination. As shown in FIG. 1, a coin processing apparatus 1 according to the present embodiment includes a coin insertion and dispensing unit 10 into which coins are inserted from the outside.

The coin insertion and dispensing unit 10 has a rotary disk 12, a side wall part 13 and a sorting ring 14. The rotary disk 12 is disposed horizontally. The side wall part 13 has a substantially cylindrical shape, and stands vertically from the outer edge of the rotary disk 12. A portion of the side wall part 13 is cut away. The sorting ring 14 is provided in the cutout portion of the side wall part 13. A gap for one coin is provided between the sorting ring 14 and the rotary disk 12.

Loose coins are inserted from outside of the apparatus into the coin insertion and dispensing unit 10. In this state, when the rotary disk 12 rotates counterclockwise in FIG. 1, the coins are conveyed along the inner peripheral surface of the side wall part 13 by centrifugal force. Furthermore, the coins are separated one by one via the gap between the rotary disk 12 and the sorting ring 14 and sequentially dispensed from the coin insertion and dispensing unit 10.

At the coin dispensing position of the coin insertion and dispensing unit 10 are provided a conveyance path 20 for guiding the coins fed out from the coin insertion and dispensing unit 10 in a line and a feed unit 21 for conveying the coins on the conveyance path 20.

The conveyance path 20 includes a first conveyance part 23, a second conveyance part 24, and a third conveyance part 25. The first conveyance part 23 is disposed along the tangential direction of the rotary disk 12. The second conveyance part 24 extends in the orthogonal direction from the opposite side of the first conveyance part 23 that the rotary disk 12 is on. The third conveyance part 25 extends in the orthogonal direction from the opposite side of the second conveyance part 24 that the first conveyance part 23 is on. The first conveyance part 23 is provided with a coin identification apparatus 27 that counts the coins currently being conveyed while identifying the denomination of each. The coin processing apparatus 1 processes coins on the basis of the identification result of the coin identification apparatus 27.

The second conveyance part 24 is provided with a reject port 28 and a reject unit 29. The reject port 28 is capable of dropping a coin and guides the dropped coin so as to be able to be taken out of the apparatus. The reject unit 29 drops the coin identified as unidentifiable by the coin identification apparatus 27 into the reject port 28. The coins dropped from the reject port 28 are discharged to a reject box (not shown).

The third conveyance part 25 is provided with a sorting unit 32 that sorts the coins counted by the coin identification apparatus 27 into denominations. The sorting unit 32 has denomination-categorized sorting ports 32a to 32f capable of dropping coins. The sorting ports 32a to 32f are arranged in the extending direction of the third conveyance part 25. The sorting ports 32a to 32f are configured such that coins having a smaller outer diameter drop further on the upstream side of the sorting ports 32a to 32f. Specifically, a 1-yen coin drops into the sorting port 32a on the most upstream side. A 50-yen coin drops into the sorting port 32b on the downstream side of the sorting port 32a. A 5-yen coin drops into the sorting port 32c on the downstream side of the sorting port 32b. A 100-yen coin drops into the sorting port 32d on the downstream side of the sorting port 32c. A 10-yen coin drops into the sorting port 32e on the downstream side of the sorting port 32d. A 500 yen coin drops into the sorting port 32f on the downstream side of the sorting port 32e. Coin detection sensors 33a to 33f for detecting coins are provided at positions immediately before the sorting ports 32a to 32f, respectively. Based on the differences in the number of coins detected by the adjacent sensors among the coin detection sensors 33a to 33f, the number of coins that have dropped into each sorting port between the adjacent sensors among the sorting ports 32a to 32f is counted.

The feed unit 21 has a plurality of conveyance belts 35 and 36. The conveyance belts 35 and 36 convey the coins dispensed from the coin insertion and dispensing unit 10 by pressing on the conveyance path 20 from above. During this conveyance, coins are first identified by the coin identification apparatus 27 and counted. Coins that cannot be identified by the coin identification apparatus 27 are made to be dropped from the reject port 28 by the reject unit 29, while the other coins are dropped from the corresponding sorting ports of the denomination-categorized sorting ports 32a to 32f in the sorting unit 32.

On the underside of the sorting ports 32a to 32f, a temporary holding unit (not shown) partitioned according to denomination and a plurality of withdrawal storage units (not shown) provided for each denomination are provided. The temporary holding unit temporarily holds coins dropped from the corresponding sorting port among the sorting ports 32a to 32f so as to be returnable to the outside of the apparatus. Each of the withdrawal storage units stores in a withdrawable manner the coins held according to denomination in the temporary holding unit.

The coin identification apparatus 27 is provided in the first conveyance part 23 of the conveyance path 20. The horizontal direction orthogonal to the coin conveyance direction in the first conveyance part 23 is defined as the passage width direction. The first conveyance part 23 has a passage part 40 and side wall parts 41 and 42. The passage part 40 has a conveyance surface 39 disposed horizontally as an upper surface thereof, and extends linearly in the tangential direction of the rotary disk 12. The side wall parts 41 and 42 are provided on both sides in the passage width direction of the passage part 40 and extend in the same direction as the extension direction of the passage part 40. The passage part 40 supports the lower surface of the coins dispensed from the coin insertion and dispensing unit 10 by the conveyance surface 39 and guides the movement of the coins. At that time, the side wall parts 41 and 42 guide the outer peripheral surfaces of the coins so that the coins are arranged in a line.

The coin identification apparatus 27 has a conveyance plate 45 that constitutes a part of the passage part 40. The conveyance plate 45 has a conveyance surface 46 which constitutes a part of the conveyance surface 39 as its upper surface. The conveyance plate 45 guides the lower surface of the coins in the same manner as the other part of the conveyance surface 39. The conveyance plate 45 is made of a translucent material, and specifically, is made of a glass plate.

Figure 2:
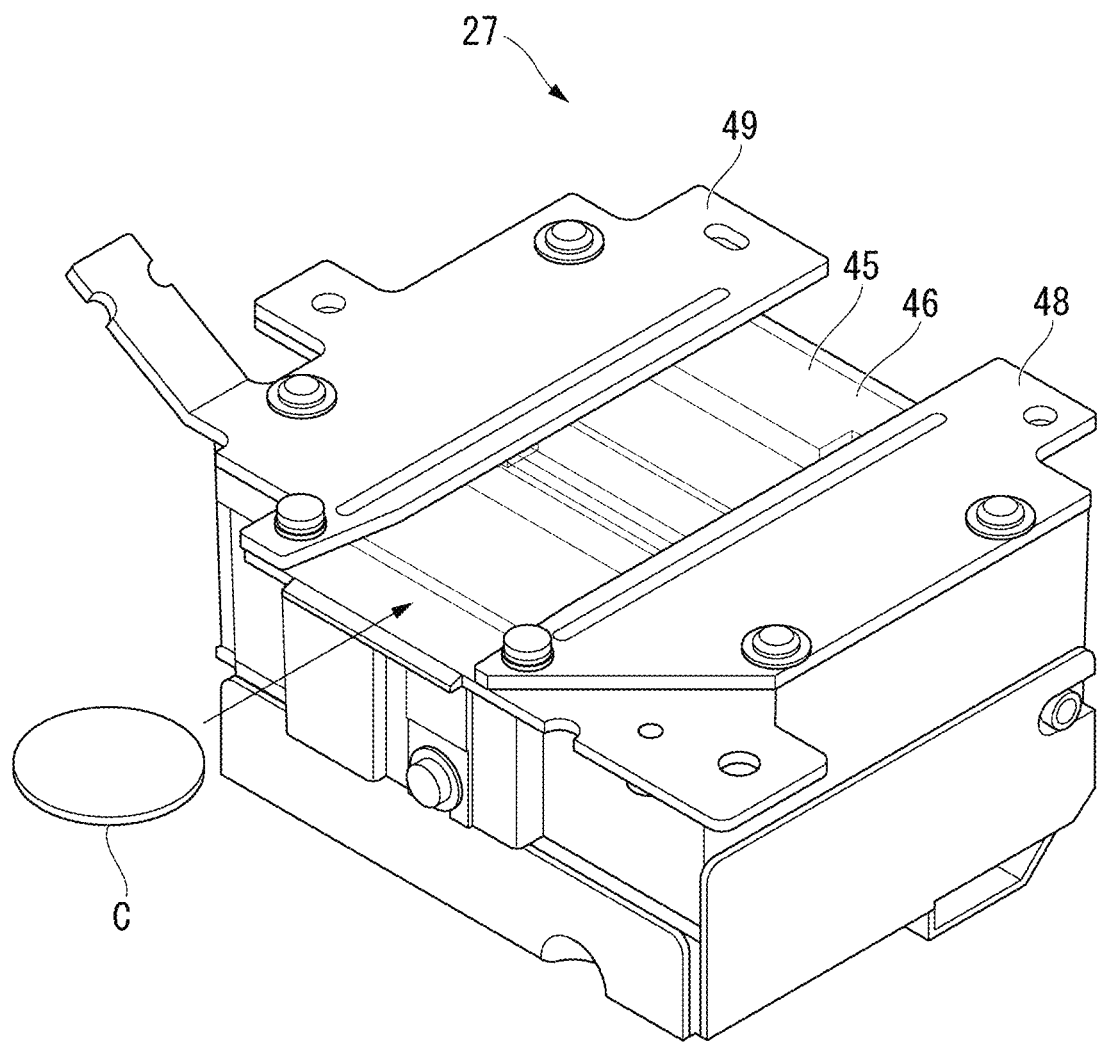
FIG. 2 is a perspective view showing the coin identification apparatus according to the embodiment of the present invention.

As shown in FIG. 2, the coin identification apparatus 27 has guide members 48 and 49 on both sides of the upper side of the conveyance plate 45 in the passage width direction. The guide member 48 constitutes a part of the side wall part 41 shown in FIG. 1. The guide member 49 constitutes a part of the side wall part 42 shown in FIG. 1. As shown in FIG. 2, the portion between the guide members 48 and 49 on the upper surface of the conveyance plate 45 is the conveyance surface 46 for a guiding coin C.

Figure 3:
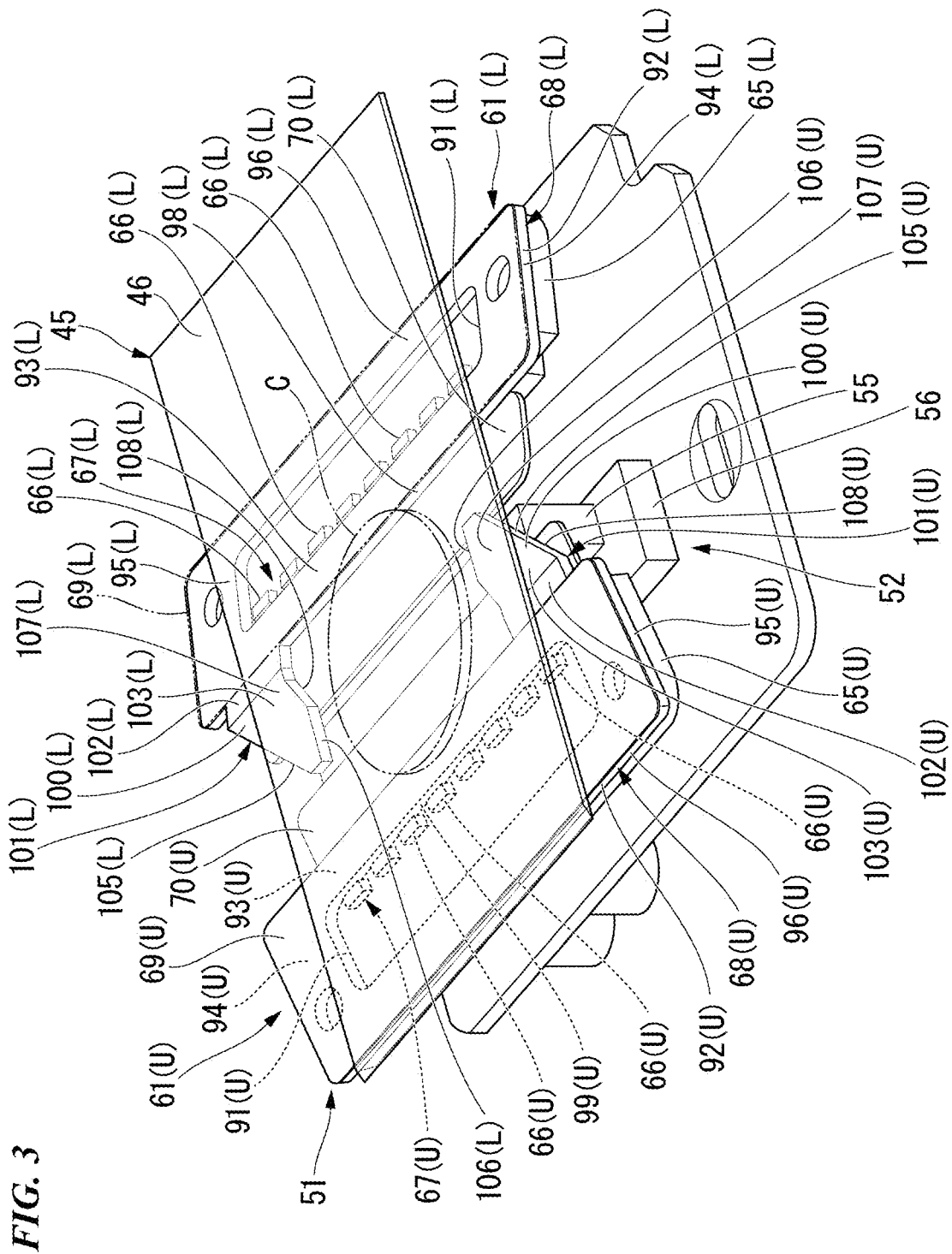
FIG. 3 is a perspective view showing the main parts of the coin identification apparatus shown in FIG. 2.
Figure 4:
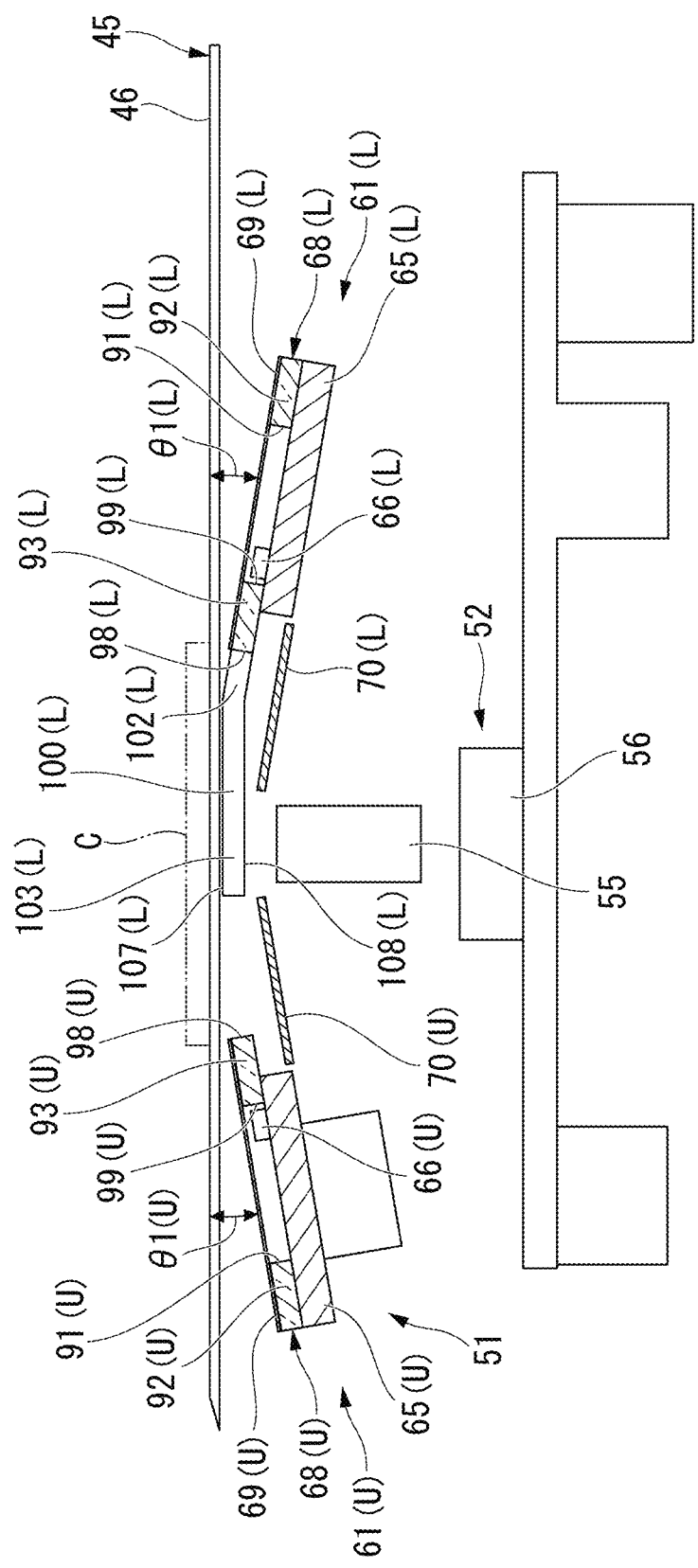
FIG. 4 is a cross-sectional view showing the coin identification apparatus shown in FIG. 2.
Figure 5:
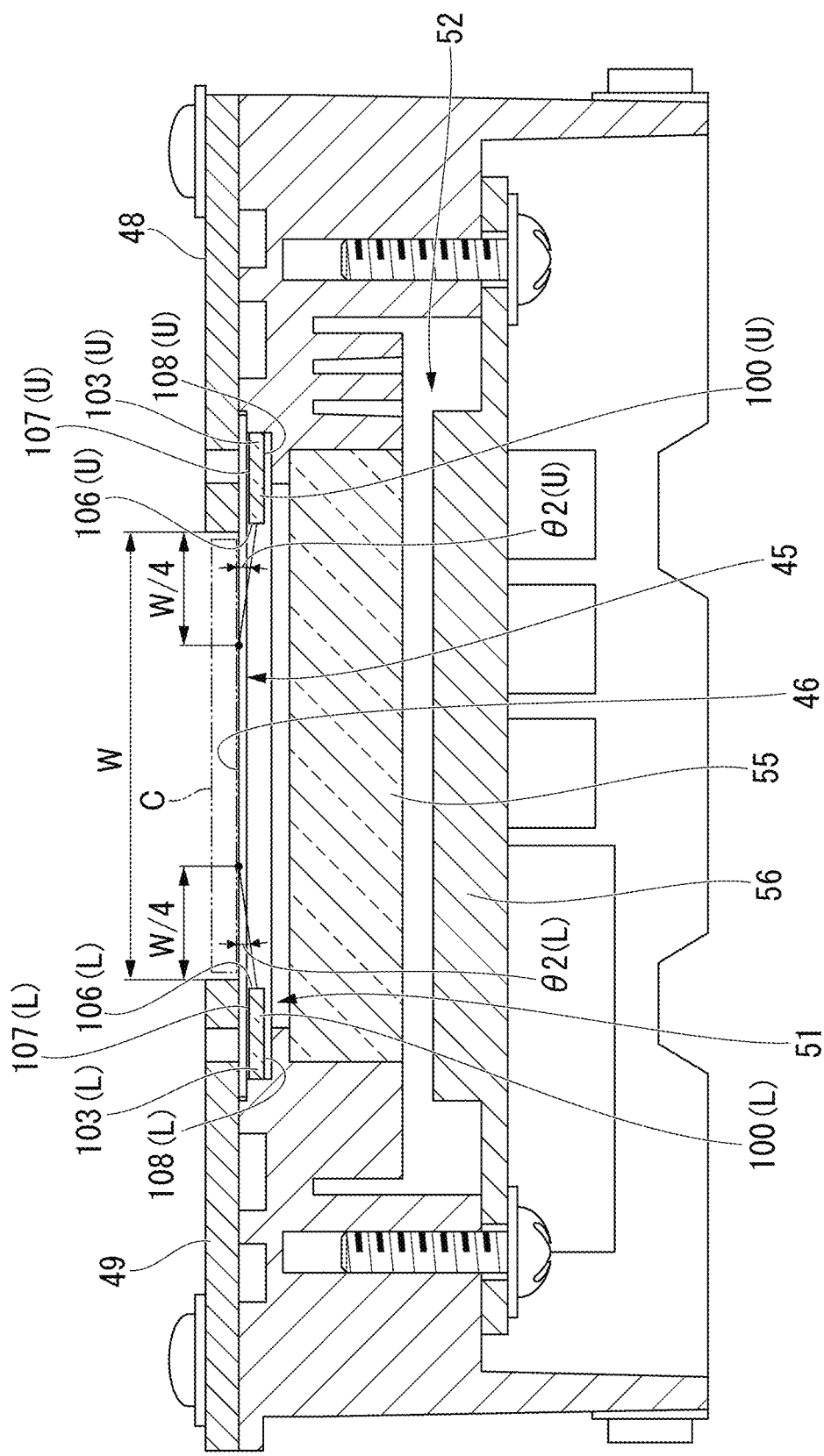
FIG. 5 is a cross-sectional view showing the coin identification apparatus shown in FIG. 2.

As shown in FIGS. 3 to 5, the coin identification apparatus 27 has the above-described conveyance plate 45, a lower irradiating unit 51, and an identification unit 52. The lower irradiating unit 51 is provided on the lower side of the conveyance plate 45 and irradiates light from the lower side on the coin C moving on the conveyance surface 46. The identification unit 52 is provided on the lower side of the conveyance plate 45 and identifies the coin C moving on the conveyance surface 46. The coin identification apparatus 27 also includes an upper irradiating unit (not shown) that irradiates light from above on the coin C moving on the conveyance surface 46.

The identification unit 52 includes a selfoc lens 55 as a light condensing unit disposed below the conveyance plate 45 and a line sensor 56 as an image detection unit disposed below the selfoc lens 55. The selfoc lens 55 and the line sensor 56 are arranged to extend in the passage width direction of the conveyance surface 46. The positions in the coin conveyance direction on the conveyance surface 46 of the selfoc lens 55 and the line sensor 56 are made to coincide with each other. The identification unit 52 detects with the selfoc lens 55 and the line sensor 56 linear images along the passage width direction of the coin C at a coin identification position directly thereabove. The linear images are connected in time series to simply detect the outer diameter and pattern of the coin C, and the authenticity, fitness, denomination, and the like are identified.

The lower irradiating unit 51 has assemblies 61 and 61 that are common parts disposed respectively on the upstream side and downstream side in the coin conveyance direction with respect to the coin identification position of a coin by the identification unit 52 (hereinafter referred to as the coin identification position), which is directly above the selfoc lens 55 and the line sensor 56.

In the following description, "(U)" is added to the reference numerals of the assembly 61 and the constituent parts thereof provided on the upstream side in the coin conveyance direction with respect to the coin identifying position, while "(L)" is added to the reference numerals of the assembly 61 and the constituent parts thereof provided on the downstream side in the coin conveyance direction with respect to the coin identifying position.

As shown in FIG. 3, the assembly 61(U) is an upstream-side assembly provided on the upstream side in the coin conveyance direction of the pair of assemblies 61(U) and 61(L). The assembly 61(U) includes a substrate 65(U), a light source 67(U), a light guide plate 68(U), a reflecting plate 69(U), and a light absorbing sheet 70(U). The substrate 65(U), the light source 67(U), the light guide plate 68(U), the reflecting plate 69(U), and the light absorbing sheet 70(U) are assembled to be constituted integrally. The light source 67(U) consists of a plurality of LEDs 66(U) mounted on the substrate 65(U). The light guide plate 68(U) is placed on the substrate 65(U). The reflecting plate 69(U) is attached to the upper surface of the light guide plate 68(U). The light absorbing sheet 70(U) is disposed below the coin identification position side of the light guide plate 68(U). The reflecting plate 69(U) is an upstream reflecting plate provided in the assembly 61(U) on the upstream side in the coin conveyance direction among the assemblies 61(U) and 61(L). The light absorbing sheet 70(U) is an upstream light absorbing sheet provided in the assembly 61(U) on the upstream side in the coin conveyance direction.

The substrate 65(U) of the upstream assembly 61(U) is inclined about a virtual axial line parallel to the passage width direction with respect to a parallel state with the conveyance surface 46 so that the downstream side in the coin conveyance direction is closer to the conveyance surface 46 than the upstream side. That is, the substrate 65(U) is inclined with respect to the conveyance surface 46. The edge on the downstream side in the coin conveyance direction of the substrate 65(U) is closer to the conveyance surface 46 than the edge on the upstream side in the coin conveyance direction of the substrate 65(U). In other words, the substrate 65(U) is inclined so as to gradually approach the conveyance surface 46 from the edge of the substrate 65(U) on the upstream side in the coin conveyance direction toward the edge of the substrate 65(U) on the downstream side in the coin conveyance direction.

The light source 67(U) mounted on the upper surface of the substrate 65(U) is an upstream light source disposed on the upstream side in the coin conveyance direction with respect to the coin identification position. A plurality (specifically, eight) of the LEDs 66(U) constituting this light source 67(U) are arranged in a row at equal intervals in the passage width direction, with the positions and heights thereof all matched in the coin conveyance direction. The direction of the optical axis of each of these LEDs 66(U) is a direction parallel to the upper surface of the substrate 65(U) and parallel to the coin conveyance direction in plan view. The LEDs 66(U) face the downstream side in the coin conveyance direction, that is, the coin identification position side. Plan view may also mean the case of viewing in a direction perpendicular to the conveyance surface 46 (the same applies below).

The light guide plate 68(U) is made of a transparent acrylic plate. In the middle portion of the light guide plate 68(U), an arrangement hole 91(U) penetrating in the thickness direction is formed. The light guide plate 68(U) is mounted on the substrate 65(U) and attached to the substrate 65(U) so as to arrange the plurality of LEDs 66(U) in this arrangement hole 91(U). The light guide plate 68(U) has a flat plate part 92(U) with a flat plate shape mounted on the substrate 65(U).

The flat plate part 92(U) has a front light guide plate part 93(U) located on the downstream side of the arrangement hole 91(U) in the coin conveyance direction, side plate parts 94(U) and 95(U) positioned on both sides in the passage width direction of the arrangement hole 91(U), and a back plate part 96(U) located on the upstream side of the arrangement hole 91(U) in the coin conveyance direction. The flat plate part 92(U), by being placed on the substrate 65(U), is arranged inclined similarly to the substrate 65(U). That is, the flat plate part 92(U) is inclined so that the downstream side is closer to the conveyance surface 46 than the upstream side in the coin conveyance direction. As shown in FIG. 4, the flat plate part 92(U) is inclined within a range of angle θ1(U) formed by the flat part 92(U) and the conveyance surface 46 being greater than 0° and equal to or less than 15°. Specifically, the flat plate part 92(U) is inclined to satisfy the condition of "θ1(U)=10°". Therefore, the flat plate part 92(U) forms an acute angle with the conveyance surface 46. The distance from the conveyance surface 46 to the flat plate part 92(U) is equal for portions of the flat plate part 92(U) with the same position in the coin conveyance direction.

The front light guide plate part 93(U) is disposed upstream of the coin identification position in the coin conveyance direction. A front end surface 98(U) and rear end surface 99(U) of the front light guide plate part 93(U) are parallel to the thickness direction of the front light guide plate part 93(U) and parallel to the passage width direction.

As shown in FIG. 3, the light guide plate 68(U) has an extension light guide plate part 100(U) that extends from one side in the passage width direction on the downstream side in the coin conveyance direction to the downstream side in the coin conveyance direction. The front light guide plate part 93(U) and the extension light guide plate part 100(U) constitute an upstream side light guide plate part 101(U) disposed on the coin identification position side of the light source 67(U).

The extension light guide plate part 100(U) has a proximal end plate part 102(U) on the proximal end side and a distal end plate part 103(U) on the distal end side. The proximal end plate part 102(U) is inclined so that the downstream side is closer to the conveyance surface 46 than the upstream side in the coin conveyance direction, in a state of being arranged on the same plane as the front light guide plate part 93(U). The distal end plate part 103(U) is bent relative to the proximal end plate part 102(U) so as to be parallel to the conveyance surface 46. The proximal end plate part 102(U) is an upstream side inclined plate part that is inclined with respect to the conveyance surface 46 at the upstream light guide plate 68(U). The distal end plate part 103(U) is a one-side parallel plate part that is parallel to the conveyance surface 46 on one side in the passage width direction.

An inclined surface 105(U) is formed on the distal end plate part 103(U) of the extension light guide plate part 100(U). The inclined surface 105(U) is located on the outer side in the passage width direction, is parallel to the thickness direction of the distal end plate part 103(U), and is inclined with respect to the coin conveyance direction in plan view. An end surface 106(U) is formed at the distal end plate part 103(U). The end surface 106 (U) is located on the inner side in the passage width direction, is parallel to the thickness direction of the distal end plate part 103(U), and is parallel to the coin conveyance direction in plan view. The end surface 106(U) is a main light emitting surface that mainly emits light in the extension light guide plate part 100(U). The central position of the end surface 106(U) in the coin conveyance direction coincides with the position of the selfoc lens 55 and the line sensor 56, that is, the coin identification position.

Among the plurality of LEDs 66(U) constituting the light source 67(U), the one LED 66(U) furthest on the side of the extension light guide plate part 100(U) is aligned with the position of extension light guide plate part 100(U) in the passage width direction. The remaining plurality of LEDs 66(U) (specifically, seven) are aligned in the passage width direction with the portion of the front light guide plate part 93(U) where the extension light guide plate part 100(U) is not formed. The front light guide plate part 93(U) is disposed between the plurality of LEDs 66(U), that is, the light source 67(U), and the coin identification position.

The front light guide plate part 93(U) guides the light from the plurality of LEDs 66(U) aligned with the front light guide plate part 93(U) in the passage width direction along the coin conveyance direction and irradiates the light from the front end surface 98(U) shown in FIG. 4 on the downstream side in the coin conveyance direction of the front light guide plate part 93(U). As a result, the light from the plurality of LEDs 66(U) is irradiated from the upstream side in the conveyance direction to the coin C at the coin identification position. The front light guide plate part 93 (U) is an upstream-side conveyance direction light guide plate part on the upstream side of the coin identification position.

The front light guide plate part 93(U) guides light on the optical axis of each of the plurality of LEDs 66(U) in a direction orthogonal to the plate thickness direction and in a direction parallel to the coin conveyance direction in plan view. The front light guide plate part 93(U) is inclined so that the downstream side is closer to the conveyance surface 46 more than the upstream side in the coin conveyance direction. Therefore, the front light guide plate part 93(U) irradiates light on the optical axis from each of the plurality of LEDs 66 (U) in a direction parallel to the coin conveyance direction in plan view, and from the upstream side and lower side to the downstream side and upper side. The irradiation angle at this time is larger than 0° and not more than 15° (specifically, 10°) with respect to the conveyance surface 46, similarly to the inclination of the front light guide plate part 93(U).

As shown in FIG. 3, in the extension light guide plate part 100(U), the proximal end plate part 102(U) guides the light on the optical axis from the LED 66(U) whose position in the passage width direction is aligned with the extension light guide plate part 100(U) in a direction orthogonal to the plate thickness direction and in a direction parallel to the coin conveyance direction in plan view, similarly to the front light guide plate part 93(U). The distal end plate part 103(U) reflects with the inclined surface 105(U) the light that has been guided. Due to the reflection, the traveling direction of the light is converted to a direction intersecting the coin conveyance direction. As a result, light from the LED 66(U), with respect to the coin C at the coin identification position, is irradiated from the lower side on the one side to the upper side of the other side along the passage width direction. That is, the extension light guide plate part 100(U) is a one-side light guide plate part positioned on the one side in the passage width direction. The inclined surface 105(U) is an upstream-side light path conversion part formed in the extension light guide plate part 100(U) of the light guide plate 68(U) on the upstream side.

More specifically, in the distal end plate part 103(U), light from the LED 66(U) on an optical axis parallel to the conveyance direction which, in plan view, follows the proximal end plate part 102(U) is reflected by the upper surface 107(U), converted to a direction parallel to the passage width direction in plan view by the inclined surface 105(U), and reflected by the lower surface 108(U). As a result, the light is irradiated from the end surface 106(U) with an attitude following the passage width direction in plan view, from one wide in the passage width direction and the lower side to the other side and the upper side. Note that due to the difference in refractive indices at the time of irradiation from the end surface 106(U) to the atmosphere, the light after irradiation is inclined further upward than immediately before irradiation. As shown in FIG. 5, the angle θ2(U) of the irradiated light with respect to the conveyance surface 46 is set to be larger than 0° and not more than 20° (specifically, 15°). The extension light guide plate part 100(U) is configured to irradiate light on the optical axis from the LED 66(U) to a position of ¼ of the passage width W, that is, a position of W/4, from the end of the conveyance surface 46 on the extension light guide plate part 100(U) side in the passage width direction.

The reflecting plate 69(U) shown in FIG. 3 covers the entire top surface of the flat plate part 92(U) of the light guide plate 68 (U), and blocks the upper opening of the arrangement hole 91(U). The extension light guide plate part 100(U) is not covered by the reflection plate. The light absorbing sheet 70(U) is attached to the substrate 65(U) via a support member (not shown). The light absorbing sheet 70(U) is disposed under the front light guide plate part 93(U) on the coin identification position side and in parallel with the front light guide plate part 93(U), and disposed below the extension light guide plate part 100(U).

The assembly 61(L) is a downstream-side assembly provided on the downstream side in the coin conveyance direction of the pair of assemblies 61(U) and 61(L). The assembly 61(L) includes a substrate 65(L), a light source 67(L), a light guide plate 68(L), a reflecting plate 69(L), and a light absorbing sheet 70(L). The substrate 65(L), the light source 67(L), the light guide plate 68(L), the reflecting plate 69(L), and the light absorbing sheet 70(L) are assembled to be constituted integrally. The light source 67(L) consists of a plurality of LEDs 66(L) mounted on the substrate 65(L). The light guide plate 68(L) is placed on the substrate 65(L). The reflecting plate 69(L) is attached to the upper surface of the light guide plate 68(L). The light absorbing sheet 70(L) is disposed below the coin identification position side of the light guide plate 68(L). The reflecting plate 69(U) is a downstream reflecting plate provided in the assembly 61(L) on the downstream side in the coin conveyance direction among the assemblies 61(U) and 61(L). The light absorbing sheet 70(L) is an downstream light absorbing sheet provided in the assembly 61(L) on the downstream side in the coin conveyance direction.

The substrate 65(L) of the downstream assembly 61(L) is inclined about a virtual axial line parallel to the passage width direction with respect to a parallel state with the conveyance surface 46 so that the upstream side in the coin conveyance direction is closer to the conveyance surface 46 than the downstream side. That is, the substrate 65(L) is inclined with respect to the conveyance surface 46. The edge on the upstream side in the coin conveyance direction of the substrate 65(L) is closer to the conveyance surface 46 than the edge on the downstream side in the coin conveyance direction of the substrate 65(L). In other words, the substrate 65(L) is inclined so as to gradually approach the conveyance surface 46 from the edge of the substrate 65(L) on the downstream side in the coin conveyance direction toward the edge of the substrate 65(L) on the upstream side in the coin conveyance direction.

The light source 67(L) mounted on the upper surface of the substrate 65(L) is an downstream light source disposed on the downstream side in the coin conveyance direction with respect to the coin identification position. A plurality (specifically, eight) of the LEDs 66(L) constituting this light source 67(L) are arranged in a row at equal intervals in the passage width direction, with the positions and heights thereof all matched in the coin conveyance direction. The direction of the optical axis of each of these LEDs 66(L) is a direction parallel to the upper surface of the substrate 65(L) and parallel to the coin conveyance direction in plan view. The LEDs 66(L) face the upstream side in the coin conveyance direction, that is, the coin identification position side.

The light guide plate 68(L) is made of a transparent acrylic plate. In the middle portion of the light guide plate 68(L), an arrangement hole 91(L) penetrating in the thickness direction is formed. The light guide plate 68(L) is mounted on the substrate 65(L) and attached to the substrate 65(L) so as to arrange the plurality of LEDs 66(L) in this arrangement hole 91(L). The light guide plate 68(L) has a flat plate part 92(L) with a flat plate shape mounted on the substrate 65(L).

The flat plate part 92(L) has a front light guide plate part 93(L) located on the upstream side of the arrangement hole 91(L) in the coin conveyance direction, side plate parts 94(L) and 95(L) positioned on both sides in the passage width direction of the arrangement hole 91(L), and a back plate part 96(L) located on the downstream side of the arrangement hole 91(L) in the coin conveyance direction. The flat plate part 92(L), by being placed on the substrate 65(L), is arranged inclined similarly to the substrate 65(L). That is, the flat plate part 92(L) is inclined so that the upstream side is closer to the conveyance surface 46 than the downstream side in the coin conveyance direction. As shown in FIG. 4, the flat plate part 92(L) is inclined within a range of angle θ1(L) formed by the flat part 92(L) and the conveyance surface 46 being greater than 0° and equal to or less than 15°. Specifically, the flat plate part 92(L) is inclined to satisfy the condition of "θ1(L)=10°". Therefore, the flat plate part 92(L) forms an acute angle with the conveyance surface 46. The distance from the conveyance surface 46 to the flat plate part 92(L) is equal for portions of the flat plate part 92(L) with the same position in the coin conveyance direction.

The front light guide plate part 93(L) is disposed downstream of the coin identification position in the coin conveyance direction. A front end surface 98(L) and rear end surface 99(L) of the front light guide plate part 93(L) are parallel to the thickness direction of the front light guide plate part 93(L) and parallel to the passage width direction.

As shown in FIG. 3, the light guide plate 68(L) has an extension light guide plate part 100(L) that extends from one side in the passage width direction on the upstream side in the coin conveyance direction to the upstream side in the coin conveyance direction. The front light guide plate part 93(L) and the extension light guide plate part 100(L) constitute a downstream side light guide plate part 101(L) disposed on the coin identification position side of the light source 67(L).

The extension light guide plate part 100(L) has a proximal end plate part 102(L) on the proximal end side and a distal end plate part 103(L) on the distal end side. The proximal end plate part 102(L) is inclined so that the upstream side is closer to the conveyance surface 46 than the downstream side in the coin conveyance direction, in a state of being arranged on the same plane as the front light guide plate part 93(L). The distal end plate part 103(L) is bent relative to the proximal end plate part 102(L) so as to be parallel to the conveyance surface 46. The proximal end plate part 102(L) is a downstream side inclined plate part that is inclined with respect to the conveyance surface 46 at the downstream light guide plate 68(L). The distal end plate part 103(L) is an other-side parallel plate part that is parallel to the conveyance surface 46 as shown in FIG. 4 on the other side opposite the distal end plate part 103(U) in the passage width direction.

As shown in FIG. 3, an inclined surface 105(L) is formed on the distal end plate part 103(L) of the extension light guide plate part 100(L). The inclined surface 105(L) is located on the outer side in the passage width direction, is parallel to the thickness direction of the distal end plate part 103(L), and is inclined with respect to the coin conveyance direction in plan view. An end surface 106(L) is formed at the distal end plate part 103(L) on the inner side in the passage width direction, being parallel to the thickness direction and parallel to the coin conveyance direction in plan view. The end surface 106(L) is a main light emitting surface that mainly emits light in the extension light guide plate part 100(L). The central position of the end surface 106(L) in the coin conveyance direction coincides with the position of the selfoc lens 55 and the line sensor 56, that is, the coin identification position. The end surface 106(L) of the distal end plate part 103(L) and the end surface 106(U) of the distal end plate part 103(U) are parallel to each other and are aligned in the coin conveyance direction. In other words, the end surface 106(L) and the end surface 106(U) are opposed in the passage width direction.

Among the plurality of LEDs 66(L) constituting the light source 67(L), the one LED 66(L) furthest on the side of the extension light guide plate part 100(L) is aligned with the position of extension light guide plate part 100(L) in the passage width direction. The remaining plurality of LEDs 66(L) (specifically, seven) are aligned in the passage width direction with the portion of the front light guide plate part 93(L) where the extension light guide plate part 100(L) is not formed. The front light guide plate part 93(L) is disposed between the plurality of LEDs 66(L), that is, the light source 67(L), and the coin identification position.

The front light guide plate part 93(L) guides the light from the plurality of LEDs 66(L) aligned with the front light guide plate part 93(L) in the passage width direction along the coin conveyance direction and irradiates the light from the front end surface 98(L) on the upstream side in the coin conveyance direction of the front light guide plate part 93(L). As a result, the light from the plurality of LEDs 66(L) is irradiated from the downstream side in the conveyance direction to the coin C at the coin identification position. The front light guide plate part 93 (L) is a downstream-side conveyance direction light guide plate part on the downstream side of the coin identification position.

The front light guide plate part 93(L) guides light on the optical axis of each of the plurality of LEDs 66(L) in a direction orthogonal to the plate thickness direction and in a direction parallel to the coin conveyance direction in plan view. The front light guide plate part 93(L) is inclined so that the upstream side is closer to the conveyance surface 46 more than the downstream side in the coin conveyance direction. Therefore, the front light guide plate part 93(L) irradiates light on the optical axis from each of the plurality of LEDs 66 (L) in a direction parallel to the coin conveyance direction in plan view, and from the downstream side and lower side to the upstream side and upper side. The irradiation angle at this time is larger than 0° and not more than 15° (specifically, 10°) with respect to the conveyance surface 46, similarly to the inclination of the front light guide plate part 93(L).

In the extension light guide plate part 100(L), the proximal end plate part 102(L) guides the light on the optical axis from the LED 66(L) whose position in the passage width direction is aligned with the extension light guide plate part 100(L) in a direction orthogonal to the plate thickness direction and in a direction parallel to the coin conveyance direction in plan view, similarly to the front light guide plate part 93(L). The distal end plate part 103(L) reflects with the inclined surface 105(L) the light that has been guided. Due to the reflection, the traveling direction of the light is converted to a direction intersecting the coin conveyance direction. As a result, light from the LED 66(L), with respect to the coin C at the coin identification position, is irradiated from the lower side on the other side, which is the opposite side of the extension light guide plate part 100(U), to the upper side of the one side, which is the side of the extension light guide plate part 100(U), along the passage width direction. That is, the extension light guide plate part 100(L) is an other-side light guide plate part positioned on the other side in the passage width direction. The inclined surface 105(L) is a downstream-side light path conversion part formed in the extension light guide plate part 100(L) of the light guide plate 68(L) on the downstream side.

More specifically, in the distal end plate part 103(L), light from the LED 66(L) on an optical axis parallel to the conveyance direction which, in plan view, follows the proximal end plate part 102(L) is reflected by the upper surface 107(L), converted to a direction parallel to the passage width direction in plan view by the inclined surface 105(L), and reflected by the lower surface 108(L). As a result, the light is irradiated from the end surface 106(L) with an attitude following the passage width direction in plan view, from one wide in the passage width direction and the lower side to the other side and the upper side. Note that due to the difference in refractive indices at the time of irradiation from the end surface 106(L) to the atmosphere, the light after irradiation is inclined further upward than immediately before irradiation. As shown in FIG. 5, the angle θ2(L) of the irradiated light with respect to the conveyance surface 46 is set to be larger than 0° and not more than 20° (specifically, 15°). The extension light guide plate part 100(L) is configured to irradiate light on the optical axis from the LED 66(L) to a position of ¼ of the passage width W, that is, a position of W/4, from the end of the conveyance surface 46 on the extension light guide plate part 100(L) side in the passage width direction.

The reflecting plate 69(L) shown in FIG. 3 covers the entire top surface of the flat plate part 92(L) of the light guide plate 68 (L), and blocks the upper opening of the arrangement hole 91(L). The extension light guide plate part 100(L) is not covered by the reflection plate. The light absorbing sheet 70(L) is attached to the substrate 65(L) via a support member (not shown). The light absorbing sheet 70(L) is disposed under the front light guide plate part 93(L) on the coin identification position side and disposed below the extension light guide plate part 100(U). The light absorbing sheet 70(L) is parallel to the front light guide plate part 93(L).

In the coin processing apparatus 1, the coins inserted into the coin insertion and dispensing unit 10 shown in FIG. 1 are dispensed from the coin insertion and dispensing unit 10, and driven by the feed unit 21 to be arranged in a line and conveyed by the conveyance path 20. Then, in the coin identification apparatus 27, as shown in FIG. 3, the coin C moves on the conveyance surface 46 during conveyance. The identification unit 52 detects at a predetermined sampling interval line image data of the lower surface of each coin C being conveyed by the line sensor 56 at the coin identification position.

Figure 6:
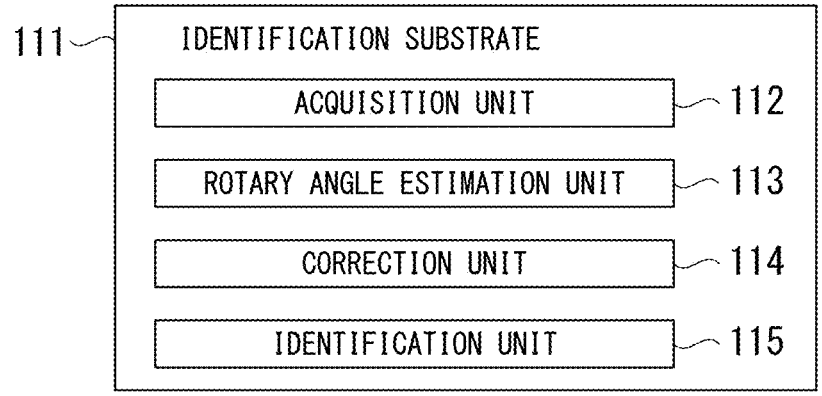
FIG. 6 is a block diagram showing the constitution of the identification substrate of the coin identification apparatus shown in FIG. 2.

The coin identification apparatus 27 has an identification substrate 111 shown in FIG. 6 that identifies coins on the basis of line image data detected by the line sensor 56. For each of the coins C conveyed on the coin identification apparatus 27, the identification substrate 111 combines multiple line image data items obtained by performing sampling at a predetermined sampling interval with the line sensor 56 to generate coin image data, and on the basis of the coin image data, performs identification of the denomination and the like of each coin. At this time, if the coin C being conveyed passes over the line sensor 56 while rotating, the coin image data may be deformed, in which case correct identification is not possible. Therefore, as a pre-process of coin identification, rotational shift of the coin image data is corrected. In the following, correction of rotational shift is referred to as rotary correction.

As shown in FIG. 6, the identification substrate 111 includes an acquisition unit (acquisition means) 112, a rotary angle estimation unit (estimation unit, rotary angle estimation means) 113, a correction unit (correction means) 114, and an identification unit (identification means) 115. The acquisition unit 112 acquires line image data detected by the line sensor 56 at a predetermined time interval and stores the line image data. The rotary angle estimation unit 113 performs for each line image data item a calculation of the similarity between the line image data acquired by the acquisition unit 112 and reference line data for each angle of reference pattern image data to estimate the rotary angle of the coin C. The correction unit 114 performs rotary correction of each line image data item on the basis of the rotary angle estimated by the rotary angle estimation unit 113. The identification unit 115 identifies the coin C by comparing the circular coin image data with the reference pattern image data on the basis of each line image data item that was rotary corrected by the correction unit 114.

Figure 7:
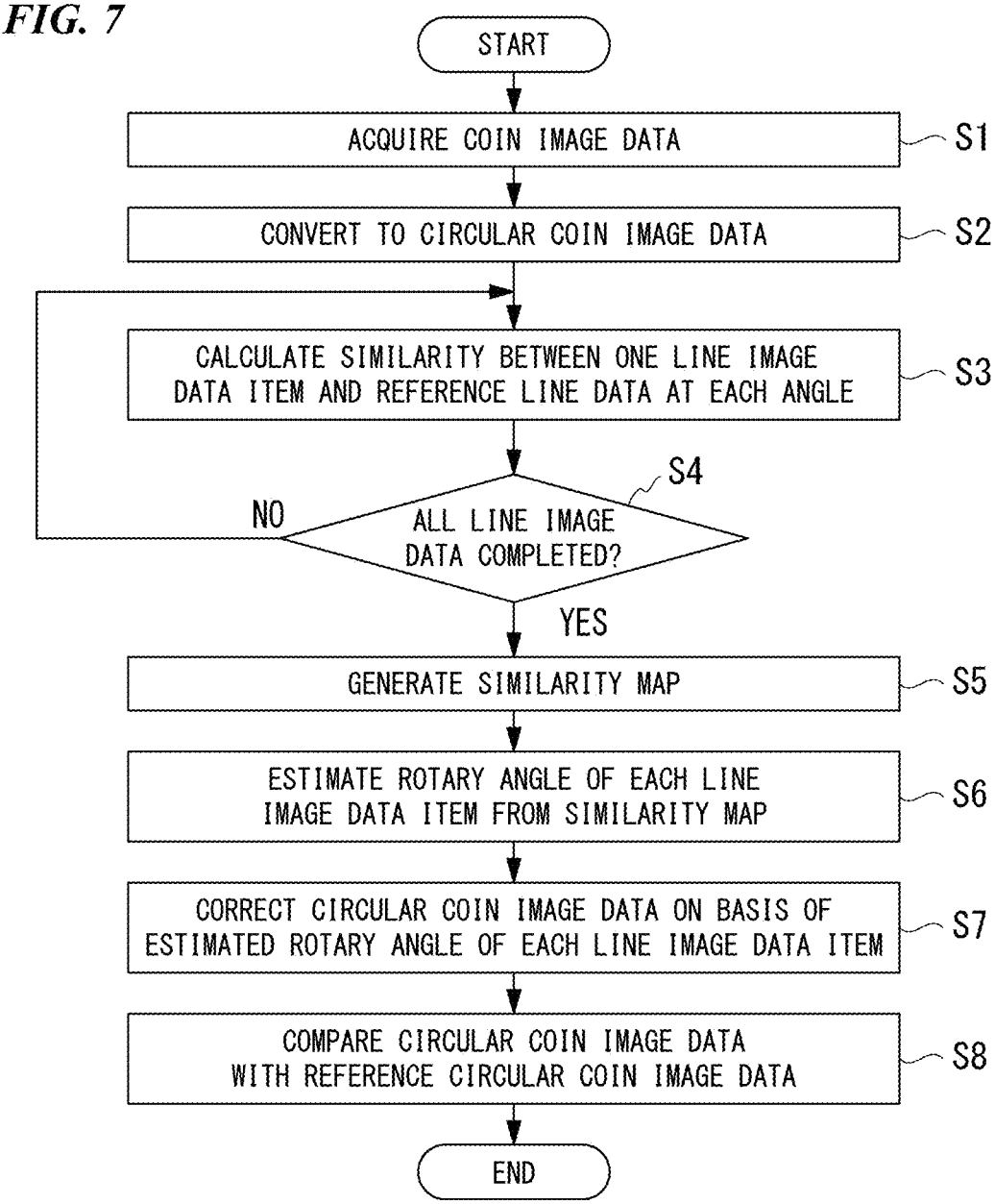
FIG. 7 is a flowchart of the coin identification process of the coin identification apparatus shown in FIG. 2.

The identification substrate 111 performs rotation correction on each to-be-detected coin C in accordance with the flow of the flowchart shown in FIG. 7.

[Step S1: Acquire Coin Image Data of to-be-Detected Coin]

Figure 8A:
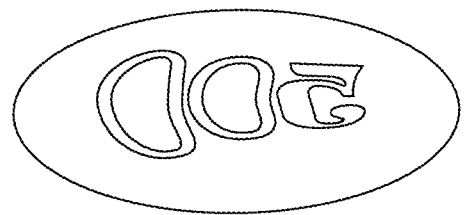
FIG. 8A shows coin image data, being detection data of the coin identification apparatus shown in FIG. 2.

In Step S1 of the flowchart shown in FIG. 7, the acquisition unit 112 acquires line image data detected by the line sensor 56 at a predetermined time interval. One line of image data is acquired for each sampling by the line sensor 56. The acquisition unit 112 acquires coin image data as shown in FIG. 8A by arranging in chronological order a plurality of one-line image data items obtained by sampling one to-be-detected coin C at each acquisition timing. At this time, if rotation occurs in the to-be-detected coin C, the coin image data indicates a coin deformed as shown in FIG. 8A. Specifically, FIG. 8A illustrates coin image data of the reverse of a 500-yen coin obtained when rotation shift occurs due to rotation of the coin C. The identification substrate 111 performs an edge enhancement filter process on the raw image data detected by the line sensor 56 to acquire coin image data.

[Step S2: Convert to Circular Coin Image Data]

Figure 8B:
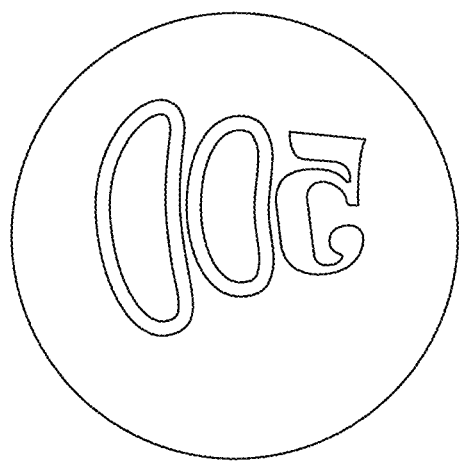
FIG. 8B shows circular coin image data after correction, being detection data of the coin identification apparatus shown in FIG. 2.

In Step S2, the rotary angle estimation unit 113 corrects the coin image data as shown for example in FIG. 8A, which was detected for one to-be-detected coin C by the acquisition unit 112, to circular data (data showing an image of a coin of a true circle) to acquire circular coin image data as shown for example in FIG. 8B.

Figure 9A:
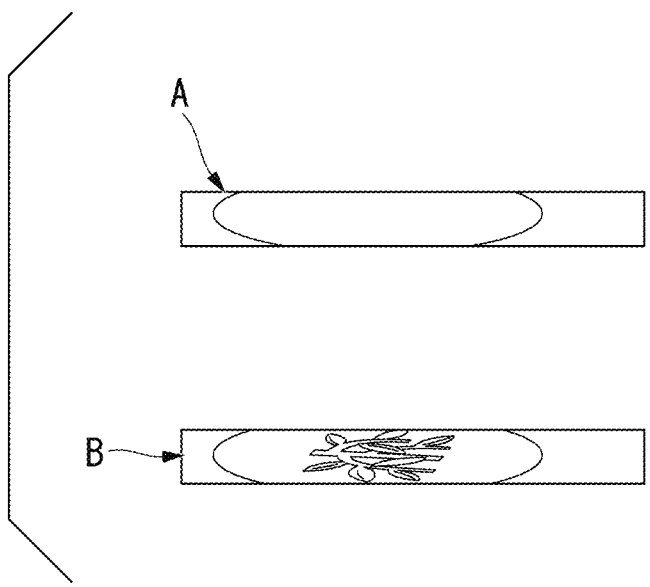
FIG. 9A shows coin image data, being detection data of the coin identification apparatus shown in FIG. 2.

Details of the principle of correcting the coin image data so as to become circular coin image data will be shown. The acquisition unit 112 acquires line image data by the line sensor 56 by alternately switching between irradiation of the to-be-detected coin C by the upper irradiating unit (not shown) and irradiation of the to-be-detected coin C by the lower irradiating unit 51. For this reason, the acquisition unit 112 alternately acquires shadow line image data acquired at the time of irradiation by the upper irradiating unit and light-facing line image data acquired at the time of irradiation by the lower irradiating unit 51. The acquisition unit 112 acquires shadow coin image data A as shown in FIG. 9A by arranging a plurality of shadow line image data items. Further, the acquisition unit 112 acquires light-facing coin image data B as shown in FIG. 9A by arranging a plurality of light-facing line image data items. The rotary angle estimation unit 113 calculates the coin width of the to-be-detected coin C from the shadow coin image data A.

Figure 9B:
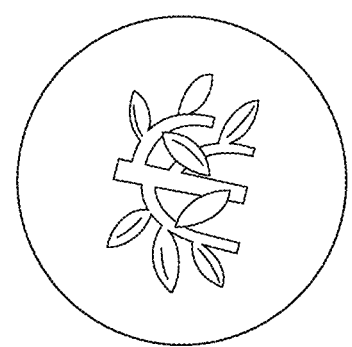
FIG. 9B shows circular coin image data after correction, which is detection data of the coin identification apparatus shown in FIG. 2.

The rotary angle estimation unit 113 calculates a section conveyance speed between sampling positions of adjacent line image data items on the basis of the difference in coin widths of the line image data items and the sampling interval for adjacent line image data items among the plurality of line image data items constituting the coin image data B. The rotary angle estimation unit 113 corrects the arrangement interval between the adjacent line image data items so that all the section conveyance speeds that have been calculated become constant, to arrange all the line image data items that have been detected for one to-be-detected coin C. By such processing, the rotary angle estimation unit 113 corrects the light-facing coin image data B of FIG. 9A into circular coin image data as shown in FIG. 9B. Thereby, even if a speed fluctuation occurs in the conveyance direction, it is possible to obtain circular coin image data from which the effect due to the speed fluctuation is removed. The rotary angle estimation unit 113 temporarily determines the denomination of the coin from the maximum value of the coin width, that is, the outer diameter, among all the line image data items for one to-be-detected coin C.

[Step S3: Calculate Similarity Between One Line Image Data Item and Each of Plurality of Reference Line Data Items]

Figure 10A:
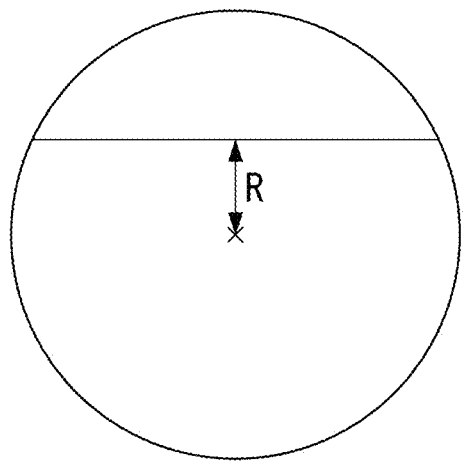
FIG. 10A is a diagram for describing the method of calculating the similarity with reference pattern image data of line image data in the coin identification apparatus shown in FIG. 2, showing the acquisition position of line image data in the circular coin image data.
Figure 10B:
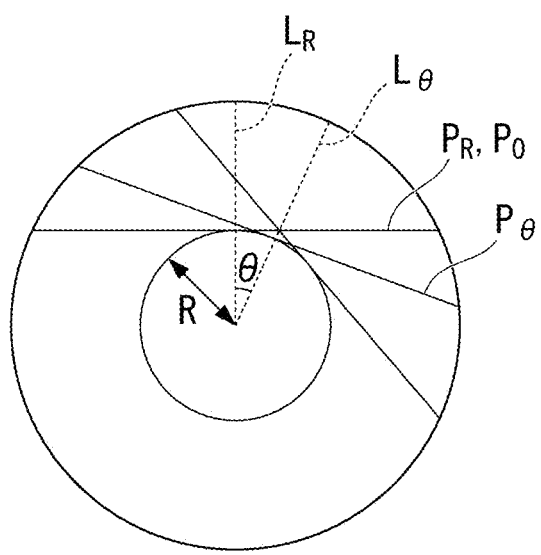
FIG. 10B is a diagram for describing the method of calculating the similarity with reference pattern image data of line image data in the coin identification apparatus shown in FIG. 2, showing the position of reference line data in the reference pattern image data.

Next, in Step S3, for coin image data converted into circular coin image data as shown in FIG. 8B, the rotary angle estimation unit 113 calculates, from line image data acquired by the acquisition unit 112, the coin width at the position of acquisition. Next, as shown in FIG. 10A, the rotary angle estimation unit 113 finds a distance R from the center of the coin in the coin image data to the acquired line image data on the basis of the coin width that was calculated. Here, as shown in FIG. 10B, there are a plurality of reference pattern image data items corresponding to the position of the distance R. The acquired line image data corresponds to any one of the plurality of reference pattern image data candidates. The rotary angle estimation unit 113, by collating the line image data (acquired line image data) shown in FIG.

Figure 11A:
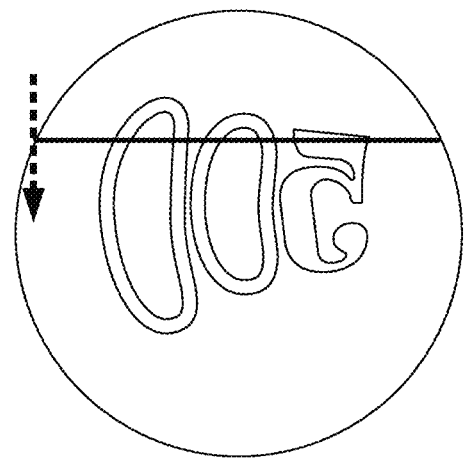
FIG. 11A is a diagram for describing the method of calculating the similarity with reference pattern image data of line image data in the coin identification apparatus shown in FIG. 2 according to one embodiment of the present invention, showing the acquisition position of line image data in the circular coin image data.
Figure 11B:
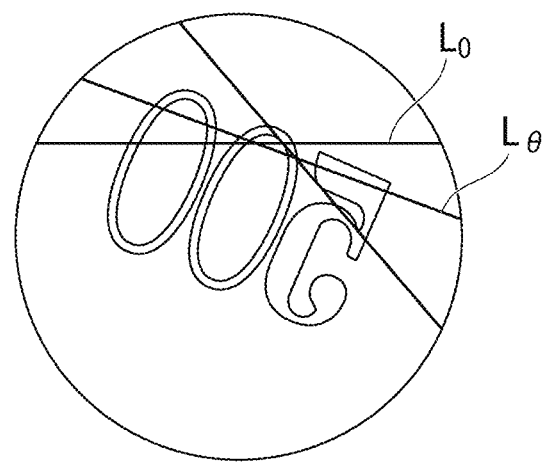
FIG. 11B is a diagram for describing the method of calculating the similarity with reference pattern image data of line image data in the coin identification apparatus shown in FIG. 2 according to one embodiment of the present invention, showing the position of reference line data in the reference pattern image data.

11A with the plurality of reference pattern image data items shown in FIG. 11B corresponding to the position of the distance R, calculates the similarity with each reference pattern image data item. Here, it is possible that the light-facing line image data indicates the obverse of the coin, or indicates the reverse of the coin. For this reason, the rotary angle estimation unit 113 may calculate the similarity by collating the light-facing line image data with both the reference pattern image data on the obverse and the reference pattern image data on the reverse. In this case, the rotary angle estimation unit 113 may specify, for example, which overall similarity is higher among the similarity with the reference pattern image data on the obverse and the similarity with the reference pattern image data on the reverse. Furthermore, the rotary angle estimation unit 113 may judge the light-facing line image data of the surface corresponding to the one with the higher similarity among the light-facing line image data of the obverse and reverse as having been acquired as the light-facing line image data.

Specifically, when scanning each line image data item by the line sensor 56, the scan is performed in a time not affected by the rotation of the coin C. Therefore, it is assumed that the line image data is not affected by rotation in the scan direction. Under this premise, the rotary angle estimation unit 113 performs the following processing. That is, as shown in FIGS. 10B and 11B, the rotary angle estimation unit 113 rotates reference line data on the same diameter (R) of the reference pattern image data indicating a circular (round) coin for each predetermined angle until the rotary angle around the center of the coin reaches 360°, to obtain reference line data of each angle (rotary angle) of the reference pattern image data. The rotary angle estimation unit 113 calculates the similarity between the line image data sampled as shown in FIG. 11A and the reference line data of each angle. Here, for the line image data of the predetermined distance R from the center of the coin C, the similarity is highest with any one reference line data among the plurality of reference line data items of the same predetermined distance R from the center on the reference pattern image data obtained by rotating until the rotary angle reaches 360°. The rotary angle estimation unit 113 calculates the reference line data having a high degree of similarity. The determination of the degree of similarity is performed on each of the plurality of line image data items that have been sampled.

The rotary angle estimation unit 113, for example, rotates the reference pattern image data in increments of 1° for a total of 360°. By rotating the reference pattern image data by 1°, the rotary angle estimation unit 113 obtains a plurality of, for example, 360 items of reference line data, the angle of each differing by 1° from the reference angle position. The rotary angle estimation unit 113 calculates the similarity between one line image data of a predetermined distance R from the center of the sampled coin C and reference line data of an angle of 0° with respect to a reference angle position of the same predetermined distance R of the reference pattern image data. Similarly, the rotary angle estimation unit 113 calculates the similarity with the reference line data at angle 1°. The rotary angle estimation unit 113 repeats the same processing from reference line data at angle 2° to reference line data at angle 359°. In this manner, the rotary angle estimation unit 113 calculates the similarity with each of a plurality of reference line data items that form different angles with respect to the reference angle position. The similarity may be expressed by a numerical value of 0 to 255, for example. The magnitude of the numerical value indicates the degree of similarity. The reference angle position may be, for example, the position $P_R$ shown in FIG. 10B. In this case, line Po in FIG. 10B indicates the position of reference line data at an angle of 0°. The line Po in FIG. 10B indicates the position of reference line data with an angle of 0°. The line Lo in FIG. 11B corresponds to reference line data of angle 0°. The line Lo in FIG. 11B corresponds to the reference line data of angle θ°. An angle may also mean an angle (for example, the angle θ in FIG. 10B) formed by a reference line (for example, the line LR in FIG. 10B) passing through the center of the coin of the reference pattern image data (coin of the reference pattern) and a line from the center of the coin of the reference pattern that is perpendicular to the reference line data (for example, the line Lo in FIG. 10B).

[Step S4: Repeat Step S3 Until Calculation of Similarity of all Line Image Data for One to-be-Detected Coin C is Completed]

In Step S4, after the rotary angle estimation unit 113, after starting detection of one to-be-detected coin C in the line sensor 56, repeats the calculation of similarity of Step S3 for all the line image data in sampling order until detection of this to-be-detected coin C is completed. In other words, the rotary angle estimation unit 113 calculates, for each line image data item, the similarity between the line image data acquired by the acquisition unit 112 and the reference line data of each angle of the reference pattern image data.

[Step S5: Generate Similarity Map]

Figure 12A:
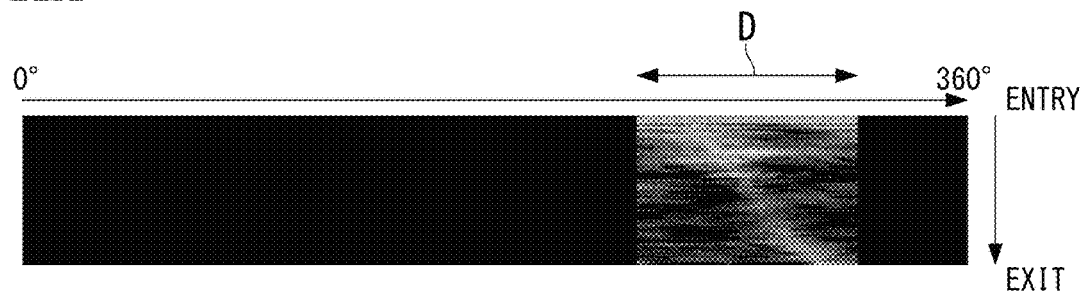
FIG. 12A shows a similarity map of the coin identification apparatus shown in FIG. 2.
Figure 12B:
FIG. 12B shows a similarity map of the coin identification apparatus shown in FIG. 2.

In Step S5, as shown in FIG. 12A, the rotary angle estimation unit 113 generates a similarity map in which the similarity (0 to 255) calculated for each sampled line image data is arranged and expressed in a binary image. The horizontal axis in FIG. 12A corresponds to the angle with respect to the reference angle position. The vertical axis direction corresponds to the sampling order. In FIGS. 12A and 12B, the white portions indicate portions with high similarity (high similarity angles).

[Step S6: Estimate Rotary Angle of Each Line Image Data Item from Similarity Map]

Figure 13:
FIG. 13 shows a high similarity line in the similarity map of the coin identification apparatus shown in FIG. 2.

In Step S6, the rotary angle estimation unit 113 extracts a portion with a high degree of similarity from the similarity map, as shown in the area X shown in FIG. 12B. Next, the rotary angle estimation unit 113 uses, for example, the least squares method to calculate a high similarity line, for example, the high similarity line Y shown in FIG. 13, connecting portions of high similarity of all line image data for one to-be-detected coin C. Note that in the case where the to-be-detected coin C has little change in rotary rotation speed while the to-be-detected coin C passes over the line sensor 56, as shown in FIG. 13, the high similarity line Y is detected as a straight line. In the case of a change in rotary rotation speed in the to-be-detected coin C while the one to-be-detected coin C passes over the line sensor 56, a high similarity line is detected as a polygonal line or a curve. The rotary angle of the line image data of each sampling is estimated on the basis of the high similarity line Y that was detected. That is, the angle of the intersection position of the high similarity line Y and the line image data is defined as the angle of the line image data with respect to the reference angle position. Setting the angle to the reference angle position of the line image data initially acquired for one to-be-detected coin C as a reference (for example, 0°), the angle of each line image data item subsequently detected in that to-be-detected coin C is defined as the rotary angle of each line image data item. In other words, the rotary angle estimation unit 113 estimates the rotary angle of the coin from the angle at the position of each line image data item of the high similarity line Y obtained by connecting the high similarity portion of each line image data item.

[Step S7: Perform rotary correction of circular coin image data by performing rotary correction of each line image data item on the basis of estimated rotary angle of each line image data item]

In Step S7, on the basis on the rotary angle of the line image data, the correction unit 114 performs angle correction on the line image data so that the rotary angle becomes 0°, to perform rotary correction on the line image data so that the rotary angle is corrected to 0°. The correction unit 114 performs rotary correction on each line image data item. The rotary angle of the line image data is the rotary angle estimated in Step S6 by the rotary angle estimation unit 113. In this rotary correction, for example, the amount of positional shift according to the rotary angle of each line image data item is found, and the position data (position) of each line image data item is then corrected so that the amount of shift becomes zero (0). Then, the rotary angle estimation unit 113 rearranges each line image data item that has been subjected to the rotary correction so as to become circular coin image data as a whole. As a result, the circular coin image data deformed by rotation as shown in FIG. 8B can be corrected to circular coin image data subjected to rotary correction as shown in FIG. 14A, in other words, circular coin image data in a state in which the deformed component due to the rotary angle has been removed.

[Step S8: Compare Corrected Circular Coin Image Data with Reference Pattern Image Data and Identify Coin]

Figure 14A:
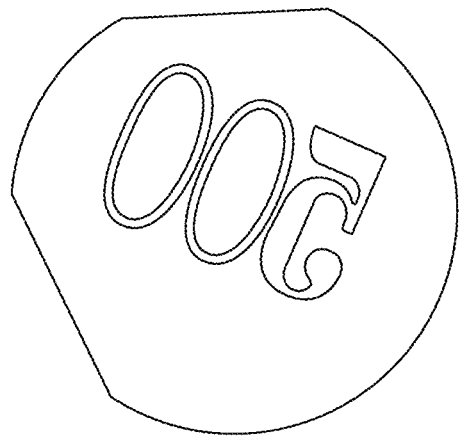
FIG. 14A is a diagram showing the detection data of the coin identification apparatus shown in FIG. 2, showing the circular coin image data after rotary correction.
Figure 14B:
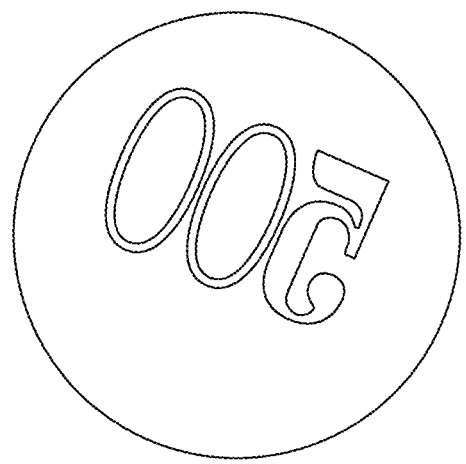
FIG. 14B is a diagram showing the detection data of the coin identification apparatus shown in FIG. 2, showing the reference pattern image data.

In Step S8, the identification unit 115 compares the circular coin image data after rotary correction as shown in FIG. 14A with the reference pattern image data as shown in FIG. 14B to calculate the coincidence. The circular coin image data after rotation correction is image data obtained by arranging each line image data item corrected by the correction unit 114 in Step S7. If the coincidence is equal to or greater than a predetermined value, the identification unit 115 identifies the to-be-detected coin C as a coin of a temporarily determined denomination. Furthermore, the identification unit 115 causes the to-be-detected coin C to be moved to the sorting unit 32 to be dropped in the corresponding denomination among the sorting ports 32a to 32f, without being dropped in the reject port 28 by the reject unit 29. On the other hand, if the coincidence is lower than the predetermined value, the identification unit 115 identifies the to-be-detected coin C as being one with an unidentifiable denomination. Further, the identification unit 115 causes the reject unit 29 to drop the to-be-detected coin C in the reject port 28 and give notice to the effect that the coin identified as being one with an unidentifiable denomination has been rejected.

That is, the coin processing apparatus 1 collates each line image data item detected by the line sensor 56 with reference pattern image data for each angle, calculates the similarity at each angle and generates a similarity map. Then, the coin processing apparatus 1 finds a connection of high similarity portions, that is, a high similarity line Y, from the generated similarity map. The coin processing apparatus 1 estimates the rotary angle in each line image data item using this high similarity line Y. The coin processing apparatus 1 corrects each line image data item using the estimated rotary angle of each line image data item to correct the circular coin image data.

According to the coin identification apparatus 27 and the coin identification method of the present embodiment described above, the acquisition unit 112 acquires line image data detected by the line sensor 56 of the coin C being conveyed at a predetermined interval (a plurality of different timings). The rotary angle estimation unit 113 estimates the rotary angle of the coin C by calculating, for every line image data item, the similarity between the line image data acquired by the acquisition unit 112 and the reference line data for each angle of the reference pattern image data. The correction unit 114 corrects each line image data item on the basis of the rotary angle thus estimated. Then, the identification unit 115 identifies the coin C by comparing the circular coin image data with the reference pattern image data on the basis of each line image data item that was thusly corrected. Thereby it is possible to improve the identification accuracy even if the coin C passes over the line sensor 56 while rotating, that is, rolling. As a result, the coin processing apparatus 1 according to the present embodiment can improve the processing accuracy of coin processing.

From the line image data acquired by the acquisition unit 112, the rotary angle estimation unit 113 calculates the coin width at the position of acquisition to finds the distance from the coin center of the acquired line image data. The rotary angle estimation unit 113 collates the line image data with the reference line data at each angle of the reference pattern image data of the distance from the coin center to calculate the similarity of each angle. Therefore, it is possible to easily calculate the degree of similarity.

Further, the rotary angle estimation unit 113 estimates the rotary angle of a coin from a similarity map showing the similarity calculated for each angle of the reference pattern image data in sampling order. For this reason, it is possible to easily calculate the rotary angle. Further, the rotary angle estimation unit 113 estimates the rotary angle of the coin from a high similarity line connecting the angle of high similarity of each line image data item with the reference line data. Therefore, it is possible to easily estimate the rotary angle.

The following modifications can be considered for the embodiment in order to reduce the processing load and shorten the processing time.

(Modification 1)

If a high similarity line can be detected, the rotary angle for each item of line image data can be estimated. For this reason, it is possible to reduce the number of line image data items for which the similarity calculation is performed in Step S3. For example, the similarity for each angle may be calculated for line image data at a predetermined interval determined in advance among all the line image data. When the number of line image data items acquired as a coin image becomes equal to or greater than a predetermined number due to a change in the conveyance speed, the number of line image data items used for the calculation of similarity may be reduced.

(Modification 2)

Figure 15A:
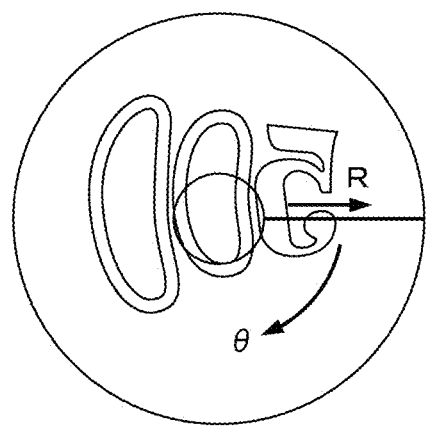
FIG. 15A is a diagram for describing modification 2 of the coin identification apparatus shown in FIG. 2, showing each coordinate of the polar coordinate transformation.
Figure 15B:
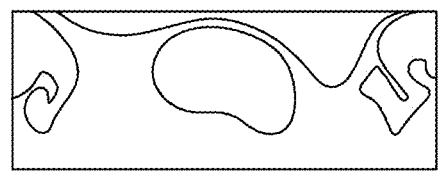
FIG. 15B is a diagram for describing modification 2 of the coin identification apparatus shown in FIG. 2, showing the circular coin image data after the polar coordinate transformation.
Figure 15C:
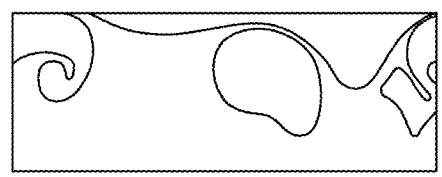
FIG. 15C is a diagram for describing modification 2 of the coin identification apparatus shown in FIG. 2, showing the reference pattern image data after the polar coordinate transformation.

In the similarity calculation of the embodiment described above, the case was described in which the reference line data on the reference pattern image data side is compared with one line image data item at each degree of 360°, but the present invention is not limited to such a case. When finding the similarity in Step S3, processing data can be reduced by limiting the detection angle range D shown in FIG. 12A. At that time, as shown in FIGS. 15A to 15C, the circular coin image data shown in FIG. 15B and the reference pattern image data shown in FIG. 15C are respectively subjected to polar coordinate transformation (developed in the r$\theta$ coordinate system), and the R-$\theta$ developed coin image and the R-$\theta$ pattern are matched in the $\theta$ direction to determine the angle $\theta$ of greatest similarity (see, for example, Japanese Patent No. 3170147). A certain range (for example, 0−α to 0+α) including the angle θ determined in this manner is set as the inspection angle range.

(Modification 3)

Figure 16:
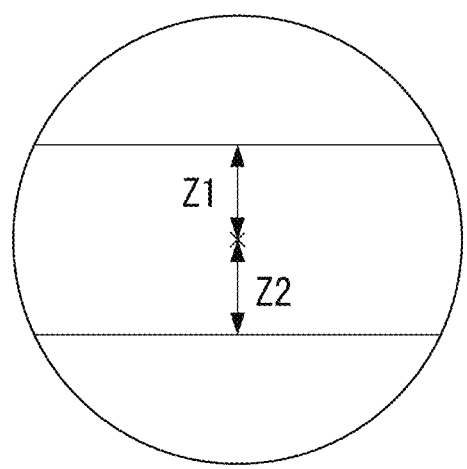
FIG. 16 is a diagram showing the detection range in modification 3 of the coin identification apparatus shown in FIG. 2.

A further modification of the first modification will be described. An image in the vicinity of the coin periphery has no effect even if the rotation angle changes (there is no denomination-specific pattern unique to coins). In view of this, for example, calculation of similarity may be started from line image data of a line passing through the center side from the inner side a predetermined distance (for example, 2 to 3 mm) from the outer peripheral end of the coin, cross a line passing through the center of the coin, and be performed until calculation of similarity of line image data of a line passing through the center side a predetermined distance (for example, 2 to 3 mm) from the outer peripheral end of the coin. The predetermined distance may be set per denomination because the surface pattern of the coin differs depending on the denomination. As a result, the amount of data for calculating the similarity can be reduced. For example, in FIG. 16, for a region Z1 on the entry side extending from the center of the coin a predetermined distance that is smaller than the radius of the coin and a region Z2 on the exit side extending from the center of the coin a predetermined distance that is smaller than the radius of the coin, similarity calculation is not performed on line image data outside of these two regions.

(Modification 4)

When the coin C is conveyed without rotating and has passed over the line sensor 56, the high similarity line Y shown in FIG. 13 is a line parallel to the vertical axis without inclination. When the coin has rotated in one direction, as shown in FIG. 13, for example, a high-similarity line Y with a linear shape descending to the right is the result. When the coin C has rotated in the reverse direction, a high-similarity line Y with a reverse linear shape descending to the left is the result. A change in contact resistance with the transport surface 46 on which the coin C is transported is thought to be the reason for the rotation of the coin C. The effect of dirt, dust and the like on the transport surface 46 is thought to be a factor of the change in the contact resistance. If the dirt on the transport surface 46 is present on average, the contact resistance is also considered quantitative, so the degree of rotation of the coin C may also be quantitative. If the degree of rotation is quantitative and the degree is small, the image detection can also be corrected as in the embodiment, and errors (image identification failure) also decrease. However, since the dirt on the transport surface 46 is rarely present on average and dust of various sizes may also be present, the contact resistance is not always quantitative.

Therefore, as shown in FIG. 13, when the similarity calculation is performed to derive the high similarity line Y, letting the angle of the high similarity line Y, that is, the angle of the high similarity line Y at the time of non-rotation, serve as a reference (0°), in the case of the angle of the high similarity line Y at the time of rotation being equal to or greater than an angle of a predetermined value, the rotary angle estimation unit 113 may determine that the accuracy of the rotation correction and hence the accuracy of the coin image identification to decrease and produce an error judgement. Further, the condition for an error judgement may further be a case where the high similarity line Y cannot be detected if the high similarity line Y is a curved line or a broken line at a ratio of a predetermined value or more. When such an error is detected, the coin processing apparatus 1 may issue a report to that effect and give a prompt for the conveyance surface 46 of the coin identification apparatus 27 to be checked or cleaned. That is, on the basis of the detection result of the high similarity line Y, it is possible to detect an abnormality in the coin identification apparatus 27 and perform notification.

A coin identification apparatus according to an embodiment of the present invention includes: a line sensor that detects line image data of a coin being conveyed, the coin being subject to identification; an acquisition unit that acquires the line image data at predetermined sampling intervals; an estimation unit that calculates, for each of the acquired line image data items, a similarity between the acquired line image data and reference line data for each angle, the reference line data being a part of reference pattern image data indicating a coin having a reference pattern, the estimation unit estimating a rotary angle of the coin subject to identification based on the calculated similarity; a correction unit that corrects the line image data based on the estimated rotary angle; and an identification unit that identifies the coin subject to identification based on the corrected line image data.

According to the above-described coin identification apparatus, the acquisition unit acquires line image data of a coin subject to identification during conveyance, the line image data being detected by a line sensor at predetermined sampling intervals. The estimation unit calculates, for each item of the acquired line image data, the similarity between the acquired line image data and reference line data that is for each angle and that is a part of reference pattern image data indicating a coin having the reference pattern. The estimation unit estimates the rotary angle of the coin subject to identification based on the calculated similarity. The correction unit corrects the line image data based on the estimated rotary angle. The identification unit identifies the coin subject to identification based on the corrected line image data. Thereby, it is possible to improve the identification accuracy even if the coin passes over the line sensor while rotating, that is, rolling.

In the coin identification apparatus described above, the estimation unit may calculate, from the acquired line image data, a width of the coin subject to identification at a position where the line image data was acquired. The estimation unit may find a distance from the acquired line image data to a center of the coin having the reference pattern, based on the calculated width. The estimation unit may use reference pattern image data at a position separated by the found distance from the center of the coin having the reference pattern, as the reference line data for each angle.

According to the coin identification apparatus described above, the estimation unit calculates, from the line image data, the width of the coin subject to identification at the position where the line image data was acquired. The estimation unit finds the distance from the acquired line image data to the center of the coin of the reference pattern based on the calculated width. The estimation unit uses, as the reference line data for each angle, reference pattern image data at a position separated by the found distance from the center of the coin of the reference pattern. Therefore, it is possible to easily calculate the similarity.

In the coin identification apparatus described above, the estimation unit may estimate the rotary angle from a similarity map in which the calculated similarities are arranged in sampling order.

According to the coin identification apparatus described above, the estimation unit estimates the rotary angle of a coin from a similarity map in which the calculated similarities are arranged in sampling order. For this reason, it is possible to easily estimate the rotary angle.

In the coin identification apparatus described above, the estimation unit may estimate the rotary angle using a line that connects, for each item of the acquired line image data, a portion of higher similarity in the calculated similarity.

According to the coin identification apparatus described above, the estimation unit estimates the rotary angle of a coin using a line that connects, for each item of the acquired line image data, a portion of higher similarity in the similarity calculated for each angle.

In the coin identification apparatus described above, the reference line data for each angle may correspond to a tangent of a circle concentric with the coin having the reference pattern. The angle may be an angle formed by a reference line passing through the center of the coin having the reference pattern and a perpendicular line from the center of the coin having the reference pattern to the reference line data.

A coin processing apparatus according to an embodiment of the present invention includes any of the coin identification apparatuses described above and processes the coin subject to identification based on an identification result by the coin identification apparatus.

According to the coin processing apparatus described above, it is possible to improve the identification accuracy of the coin identification apparatus even if a coin passes over the line sensor while rotating, that is, rolling. For this reason, it is possible to improve the processing accuracy of coin processing.

A coin identification method according to an embodiment of the present invention includes: acquiring, at predetermined sampling intervals, line image data of a coin being conveyed, the coin being subject to identification, the line image data being detected by a line sensor; calculating, for each of the acquired line image data items, a similarity between the acquired line image data and reference line data for each angle, the reference line data being a part of reference pattern image data indicating a coin having a reference pattern; estimating a rotary angle of the coin subject to identification based on the calculated similarity; correcting the line image data based on the estimated rotary angle; and identifying the coin subject to identification based on the corrected line image data.

According to the coin identification method described above, line image data, detected by a line sensor, of a currently conveyed coin that is subject to identification is acquired at predetermined sampling intervals. The similarity between the acquired line image data and reference line data that is for each angle and that is a part of reference pattern image data indicating a coin having a reference pattern is calculated for each of the acquired line image data items. The rotary angle of the coin subject to identification is estimated based on the calculated similarity. The line image data is corrected based on the estimated rotary angle. The coin is identified based on the corrected line image data. Thereby it is possible to improve the identification accuracy even if the coin passes over the line sensor while rotating, that is, rolling.

The present invention may be applied to a coin identification apparatus, a coin processing apparatus, and a coin identification method.

What is claimed is:

1. A coin identification apparatus comprising:
   a line sensor that detects line image data of a coin being conveyed, the coin being subject to identification;
   an acquisition unit that acquires the line image data at predetermined sampling intervals to acquire a plurality of line image data;
   an estimation unit that calculates, for each of the plurality of line image data, a similarity between the line image data and reference line data for each angle, the reference line data being a part of reference pattern image data indicating a coin having a reference pattern, the estimation unit estimating, for each of the plurality of line image data, a rotary angle of the coin subject to identification based on the calculated similarity;
   a correction unit that corrects the plurality of line image data based on the estimated rotary angle; and
   an identification unit that identifies the coin subject to identification based on the corrected plurality of line image data.

2. The coin identification apparatus according to claim 1, wherein the estimation unit calculates, from each of the plurality of line image data, a width of the coin subject to identification at a position where the line image data was acquired,
   the estimation unit finds, for each of the plurality of line image data, a distance from the line image data to a center of the coin having the reference pattern, based on the calculated width, and
   the estimation unit uses reference pattern image data at a position separated by the found distance from the center of the coin having the reference pattern, as the reference line data for each angle.

3. The coin identification apparatus according to claim 1, wherein the estimation unit estimates the rotary angle from a similarity map in which the calculated similarities are arranged in sampling order.

4. The coin identification apparatus according to claim 1, the estimation unit estimates the rotary angle using a line that connects, for each of the plurality of line image data, a portion of higher similarity in the calculated similarity.

5. The coin identification apparatus according to claim 1,
   wherein the reference line data for each angle corresponds to a tangent of a circle concentric with the coin having the reference pattern, and
   the angle is an angle formed by a reference line passing through the center of the coin having the reference pattern and a perpendicular line from the center of the coin having the reference pattern to the reference line data.

6. A coin processing apparatus comprising:
   the coin identification apparatus according to claim 1,
   wherein the coin processing apparatus processes the coin subject to identification based on an identification result by the coin identification apparatus.

7. A coin identification method comprising:
   acquiring, at predetermined sampling intervals, line image data of a coin being conveyed to acquire a plurality of line image data, the coin being subject to identification, the line image data of the coin being conveyed being detected by a line sensor;
   calculating, for each of the plurality of line image data, a similarity between the line image data and reference line data for each angle, the reference line data being a part of reference pattern image data indicating a coin having a reference pattern;
   estimating, for each of the plurality of line image data, a rotary angle of the coin subject to identification based on the calculated similarity;
   correcting the plurality of line image data based on the estimated rotary angle; and identifying the coin subject to identification based on the corrected plurality of line image data.

* * * * *